US008662699B2

(12) United States Patent
Tarter

(10) Patent No.: US 8,662,699 B2
(45) Date of Patent: Mar. 4, 2014

(54) LANTERN WITH REMOVABLE LIGHTS

(75) Inventor: Kevin J. Tarter, Wichita, KS (US)

(73) Assignee: The Coleman Company, Inc., Wichita, KS (US)

( * ) Notice: Subject to any disclaimer, the term of this patent is extended or adjusted under 35 U.S.C. 154(b) by 251 days.

(21) Appl. No.: 12/920,133

(22) PCT Filed: Feb. 20, 2009

(86) PCT No.: PCT/US2009/034641
§ 371 (c)(1),
(2), (4) Date: Oct. 5, 2010

(87) PCT Pub. No.: WO2009/111184
PCT Pub. Date: Sep. 11, 2009

(65) Prior Publication Data
US 2011/0012518 A1 Jan. 20, 2011

Related U.S. Application Data

(60) Provisional application No. 61/032,782, filed on Feb. 29, 2008.

(51) Int. Cl.
*F21L 4/00* (2006.01)
*F21L 13/00* (2006.01)

(52) U.S. Cl.
USPC ....... 362/183; 362/295; 362/394; 362/249.13

(58) Field of Classification Search
USPC .............................. 362/183, 295, 394, 249.13
See application file for complete search history.

(56) References Cited

U.S. PATENT DOCUMENTS

| 6,819,080 B2 * | 11/2004 | Barbeau et al. ............... 320/107 |
| 7,021,802 B1 * | 4/2006 | Wyatt ............................. 362/477 |
| 7,782,223 B2 * | 8/2010 | Lang et al. ............... 340/815.45 |
| 2003/0002297 A1 * | 1/2003 | Nemtsev ....................... 362/571 |

FOREIGN PATENT DOCUMENTS

KR 10-0109118 A * 11/2005 ............... F21L 4/00

* cited by examiner

*Primary Examiner* — Stephen F Husar
*Assistant Examiner* — James Cranson, Jr.

(57) ABSTRACT

A lantern having a plurality of removable area lights. Each area light includes a separate power source capable of powering the area light. Each area light is separately selectively illuminable by activating a switch on the area light. The lantern includes a docking station having a docking station power source capable of simultaneously powering all area lights attached to the docking station simultaneously or any subset of the area lights attached to the docking station.

21 Claims, 6 Drawing Sheets

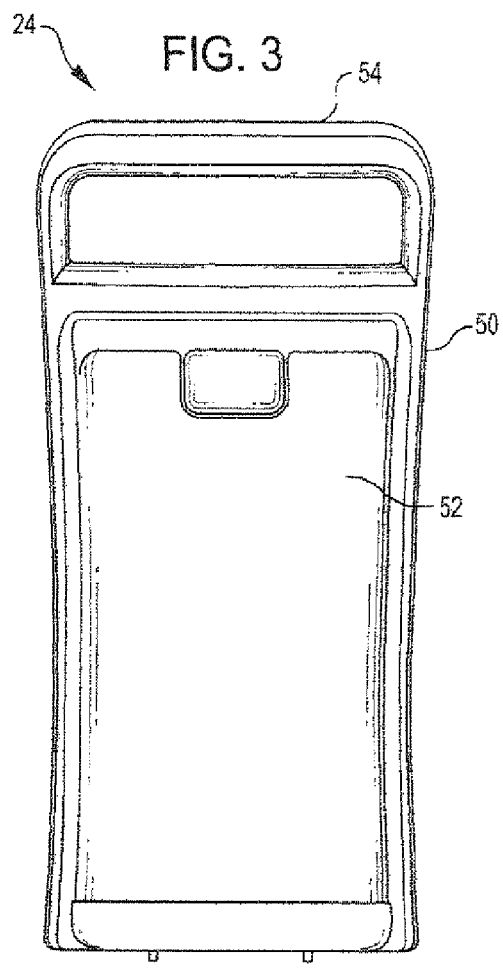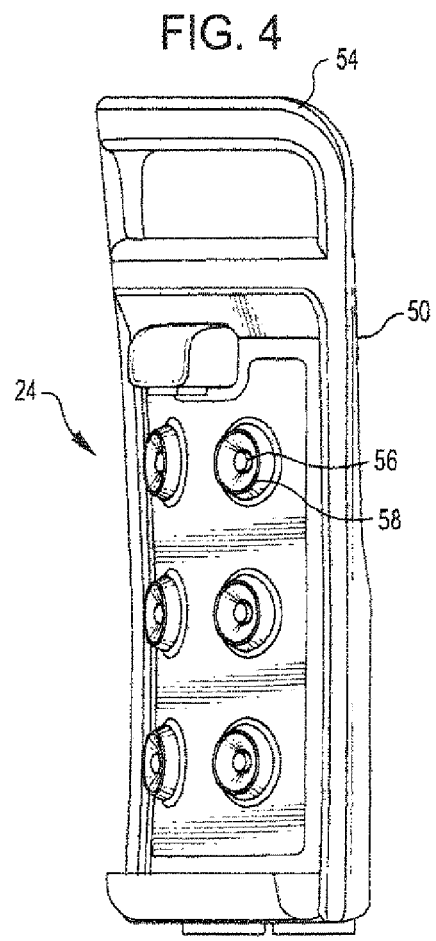

LANTERN WITH REMOVABLE LIGHTS

FIELD OF THE INVENTION

The invention relates to a portable lantern, and more particularly, to a portable lantern having a plurality of removable area lights.

BACKGROUND OF THE INVENTION

Lanterns are portable light sources able to stand on their own and illuminate a general area. Lanterns are very popular for outdoor activities such as camping when other light sources are impractical or not available, In addition, lanterns are often kept as a spare light source for use at home or other places during power outages or other situations where light is otherwise not available.

Lanterns can have differing power sources. For example, they can utilize mantles to burn fuel or have batteries that power electric lights. Electric lanterns are typically used by placing or hanging a lantern in a vicinity to be illuminated and flipping a switch to provide power to an electric light source. A lantern may be carried by a person from place to place so as to illuminate the general vicinity around the person as he or she moves.

While lanterns are suitable for this general purpose, it can be inconvenient to carry a lantern from place to place if light is needed in more than one area. For example, if two or more people are using a lantern at once, one person may need light in one area while another may need light in another area. Often it is desirable to illuminate several areas that are commonly used. It is often impractical and not cost effective to carry multiple lanterns for illuminating multiple areas, especially in situations, such as camping, where storage space is limited.

SUMMARY OF THE INVENTION

The present disclosure provides a portable lantern. The portable lantern includes a docking station having a first power supply. The portable lantern further includes a plurality of area lights are removably connectable to the docking station. Each of the plurality of area lights has a second power supply.

The docking station is configured so that the first power supply can provide power each of the plurality of lanterns removably connected to the docking station, illuminating each of the plurality of lanterns connected to the docking station. The plurality of area lights are each configured so that the second power supply can supply power to illuminate the area light when disconnected from the docking station. The first power supply can further charge the second power supply of each area lights docked in the docking station.

In an embodiment, a portable lantern includes a docking station having a base and a neck portion, the neck portion including a plurality of docking bays. A first power supply is positioned within the docking station. A plurality of area lights a removably connectable to the docking station, each of the plurality of area lights being removably connectable to the within one of the plurality of docking bays. Each of the area lights includes a light sources and a second power supply. The first power supply can selectively power each of the light sources of the plurality area lights connected to the docking station and each of the plurality of area lights is configured so that the second power supply can selectively power the light source when the area light is disconnected from the docking bay.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 depicts a front view of an area light of the lantern of FIG. 1;

FIG. 4 depicts a side perspective view of the area light of FIG. 3;

DETAILED DESCRIPTION OF THE INVENTION

The present disclosure is directed to a portable lantern including a plurality of removable sub-lanterns (area lights). When the sub-lanterns are connected to the lantern, the lantern can be operated as single light source. Alternatively, when one or more of the sub-lanterns are removed from the lantern, each of the removed sub-lanterns can act as a separate and distinct light source.

The lantern includes a base unit (docking station) having a power sources, such as primary cell batteries, rechargeable batteries, or an other type of direct current (DC) power source. The sub-lanterns are removably attached to the base unit, where the sub-lanterns are in electrical communication with the power source of the base unit. In the attached configuration, the power source provides power to each of the connected sub-lanterns.

The sub-lanterns each include a separate power source. When a sub-lantern is separated from the base unit, the sub-lantern power source provides power to light the removed sub-lantern.

Figure 1:
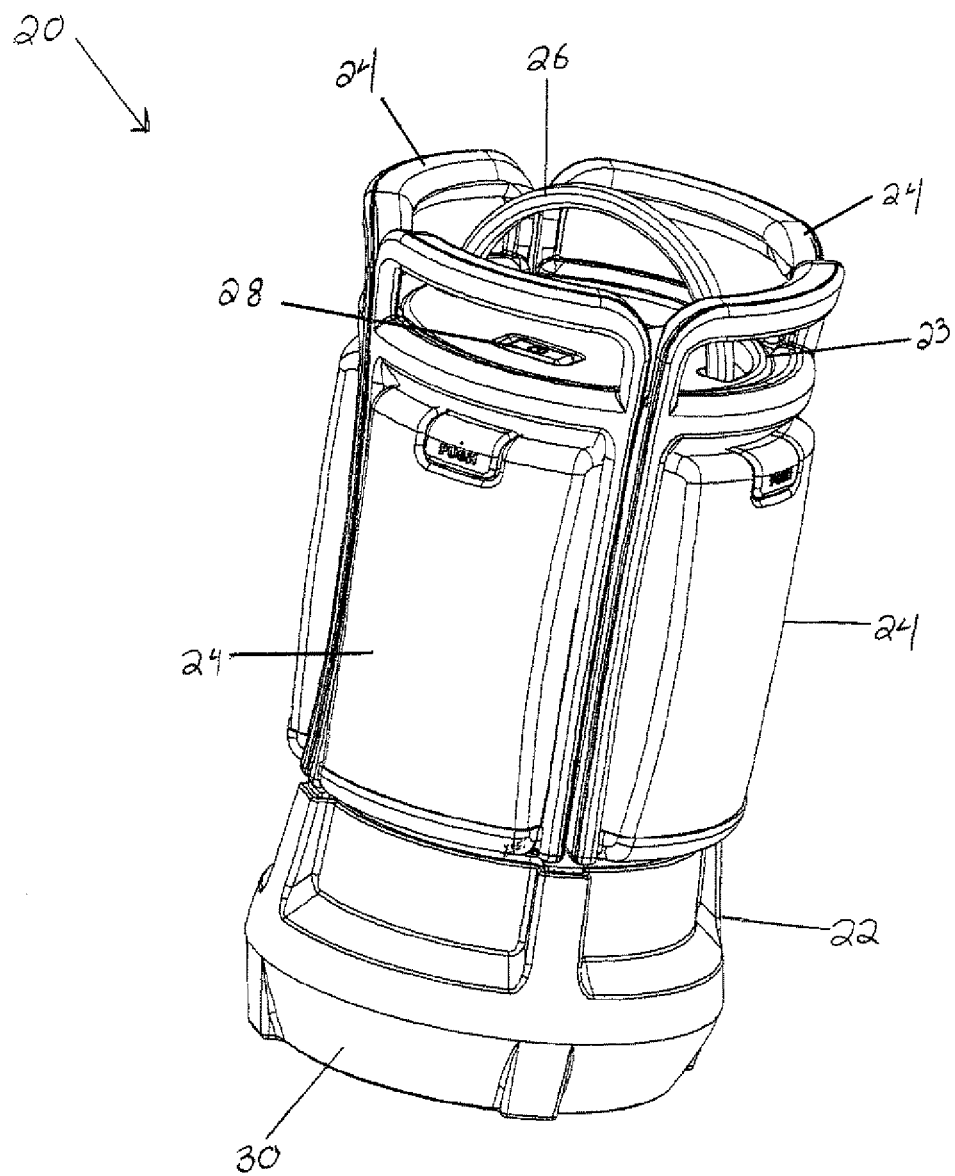
FIG. 1 depicts a perspective view of a lantern of the present disclosure.

Referring now to the drawing figures in which like reference designators refer to like elements, there is shown in FIG. 1 a lantern 20 including a docking station 22 around which a plurality of area lights 24 are removably attached. A handle 26 extends in an inverted u-shape from a top end 23 of the lantern 20. The handle 26 can be movable between extended and closed positions, where the handle 26 is rotated down against the top end 23 of the docking station 22 in the closed position.

A docking station power switch 28 can be positioned on the top end 23 of the docking station 22 for controlling the emission of light from area lights 24, when the area lights are attached to the docking station 22. The power switch 28 is depicted on the top end 23 for exemplary purposes only, and it may be located on any accessible area of the docking station 22. In the embodiment shown, the lantern 20 includes four identical area lights 24. However, the lantern can have more or less than four area lights and the area lights 24 of the lantern 20 need not be identical in size, wattage, or configuration.

Figure 2:
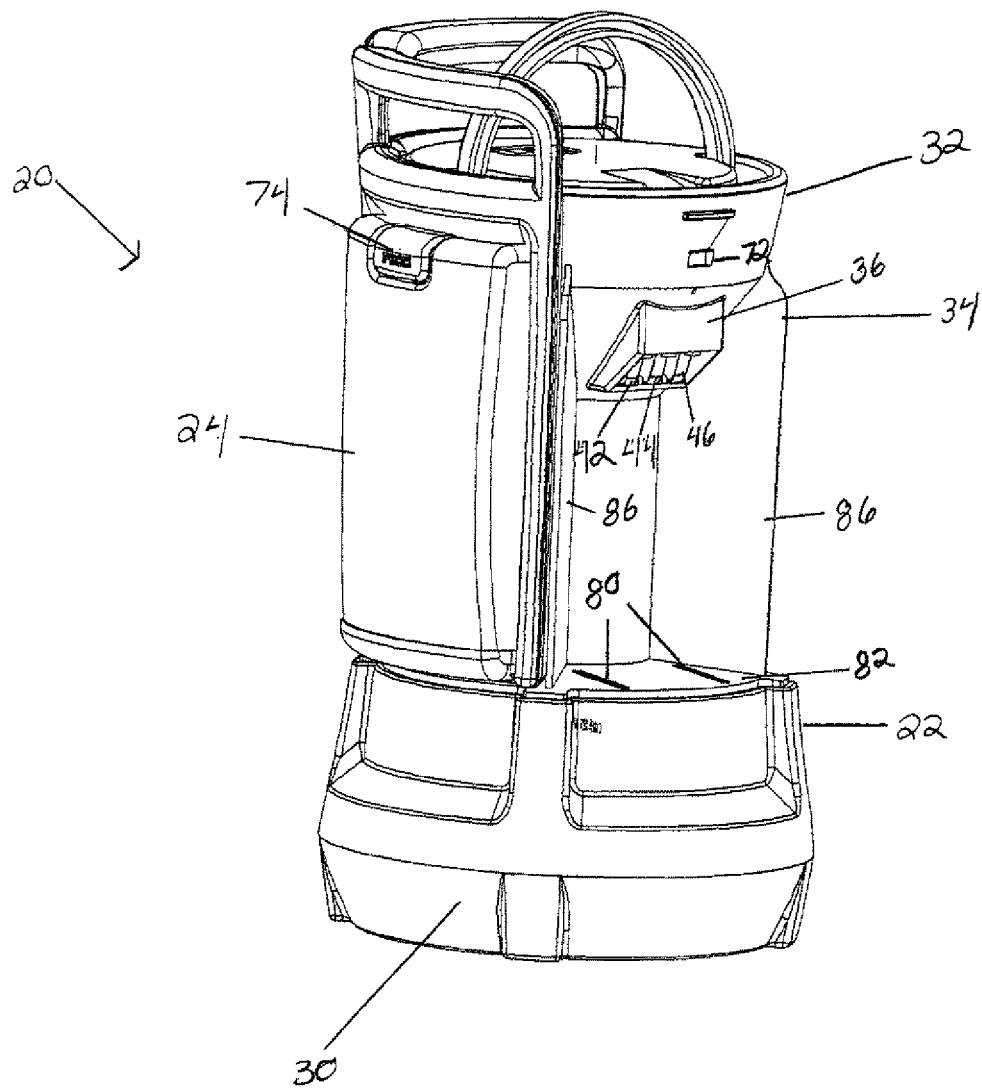
FIG. 2 depicts a perspective view of the lantern of FIG. 1 having two area lights removed from a docking station.

Generally, the docking station 22 is any structure capable of supporting the area lights 24 so that the area lights 24 illuminate a general area around the docking station 22. Referring to FIG. 2. the docking station 22 can include an interior power source (not shown), such as battery, for providing electrical power to the area lights 24. The battery can be positioned within a base 30 portion of the docking station 22. A neck portion 32 of the docking station 22 extends upwardly from the base portion 30. The base portion 30 can have a cylindrical or other shape suitable for supporting the neck portion 32. In an embodiment, the power source is located in the base portion 30, although it may be located in the neck portion 32, or in any other suitable location.

The neck 32 can be an elongate, generally cylindrical structure extending upwardly from the base 30 and having a plurality of docking bays 34 forming an outer vertical surface of the neck 32. An electrical connection port 36 is positioned in each of the docking bays 34, where each of the electrical connection ports 36 engage an corresponding electrical connection port 38 on a back surface 40 of each of the area lights 24 (See also FIG. 5).

The electrical connection ports 36 may be any structure capable of attaching to a corresponding electrical connection port 38 of an area light 24. In an embodiment, electrical connection 36 is a box-shaped structure extending from the neck 32 into a corresponding docking bay 34. A plurality of electrical contacts is positioned in an interior of the electrical connection port 36. The electrical contacts can include a first, second, and third docking station contacts 42, 44, 46, each of which is configured to electrically connect to a corresponding electrical contact in the electrical connection port 38 of an area lights 24.

Referring to FIG. 3, each area light 24 includes an area light body 50, which, in an embodiment, is an elongate rectangular structure of material, such as plastic, having an exterior surface partially covered by a lens 52. The lens 52 can be any material through which light is transmitted, such as transparent or semi-transparent plastic or glass. A handle 54 extends upwardly from the area light body 50, which can be in the form of an inverted u-shape.

Referring to FIG. 4, an area light 24 is depicted with the lens 52 removed. The area light 24 can include one or more light sources 56. The light sources 56 can be positioned within a reflective surround 58. The reflective surround 58 can be configured to reflect light from a corresponding light source 56 through the lens 52.

In an embodiment, the light sources 56 are light emitting diodes (LEDs) each of which is positioned within a reflective surround 58. While LED light sources 56 are depicted in the drawings, it is envisioned the other light sources can be used, including but not limited to, incandescent, halogen, or fluorescent lights. The lights sources can be used singulars, or in combination.

Figure 5:
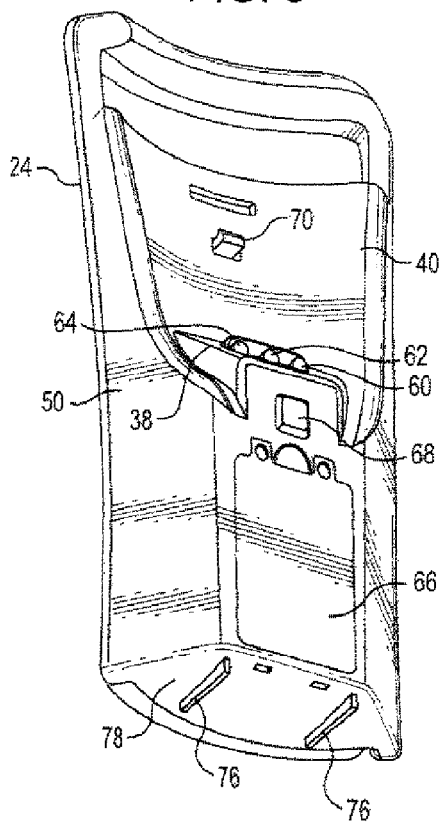
FIG. 5 depicts a rear perspective view of the area light of FIG. 3.

Referring to FIG. 5, the back surface 40 of an area light 24 is provided. The back surface 40 is located opposite the lens 52. The area light electrical connection port 38, located on the back surface 40, includes first, second, and third contacts 60, 62, 64. Each of the area light contacts 60, 62, 64 is configured to engage one of the docking station contacts 42. 44, 46 when the area light 24 is in the docking bay 34 of the docking station 22. Specifically, in the embodiment shown, when the area light 24 is in the docking bay 34 of the docking station 22, the first area light contact 60 engages and provides an electrical connection with the first docking station contact 42, the second area light contact 62 engages and provides an electrical connection with the second docking station contact 44, and the third area light contact 64 engages and provides an electrical connection with the third area light contact 46.

While the drawings show three docking station contacts 42, 44, 46 corresponding to three area light contacts 60, 62, 64, the number of contacts can vary according to the circuitry included in both the docking station 22 and each area light 24.

The back surface 40 of the area light 24, in an embodiment, also includes a battery door cover 66, providing access to a power source of the area light 24. In general, the battery door cover 66 can be any structure allowing selective access to the power source of the area light 24. In an embodiment, the power source of the area light 24 includes one or more rechargeable batteries, although other battery types or power sources can be used.

A power switch 68 can optionally be positioned on the rear surface 40 of the area light 24. The power switch 68 can control the emission of light from the light source 56 when the area light 24 is separated from the docking station 22. While, the area light power switch 68 is depicted on the back surface 40, the power switch 68 may be located on other portions of the area light 24, such as on the exterior front surface or, in general, in any location accessible by a person when the area light 24 is apart. from the docking station 22.

A locking mechanism is provide for maintain an area light 23 in a docking hay 34. The locking mechanism can include an actuatable latching system when can be used to removable secured an area light 24 in a docking bay 34.

Referring to FIGS. 2 and 5, the back surface 40 of the area light 24 includes a hook 70 configured to engage the latch hole 72 in the docking bay 34, so as to selectively maintain the area light 24 in place in the docking bay 34 of the docking station 22. The hook 70 is configured to be mechanically attached to the release button 74 so that the hook 70 releases the latch hole 72 when the release button 74 is pressed inwardly, thereby allowing a person to remove the area light 24 from the docking station 22.

To further secure an area light 24 in a docking bay 34, an alignment rail may be provided on the area light 24. In an embodiment, a pair of parallel rails 76 extends along a bottom portion 78 of the area light body 50. Corresponding slots 80 are provide in a bottom portion 80 of a docking bay 34. When an area light 24 is positioned in a docking bay 34, each of the mils 76 extends into a corresponding slot 80, thereby substantially preventing lateral movement of the bottom portion 78 of the area light 24.

In general, any structure or mechanism on the area light 24 corresponding to a complementary structure on the docking station 22 can be used in addition to or as an alternative to the slots 80 and rails 76 so as to prevent movement of the area light 24 relative to the docking station 22 when the area light 24 is docked at the docking station 22.

Figure 6:
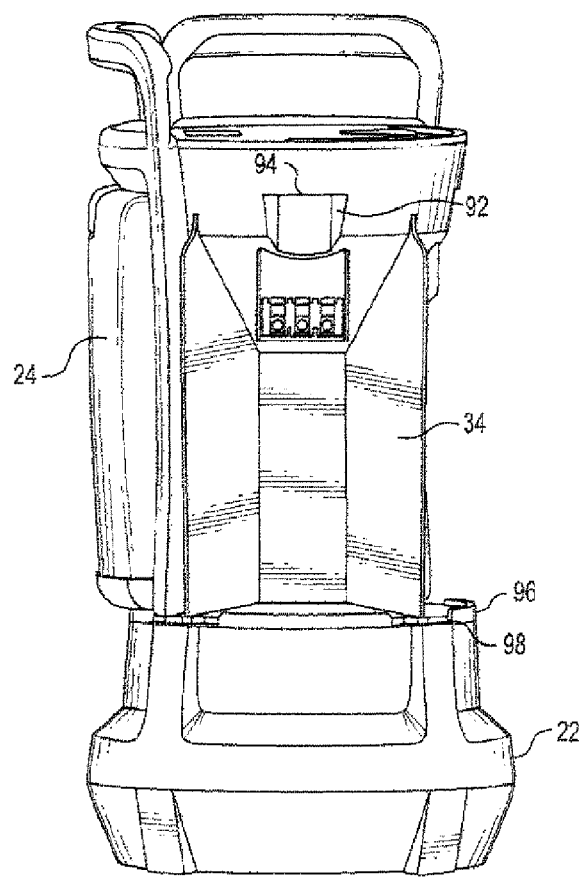
FIG. 6 depicts a perspective view of an alternatively locking mechanism for the area lights of the lantern of FIG. 1.
Figure 7:
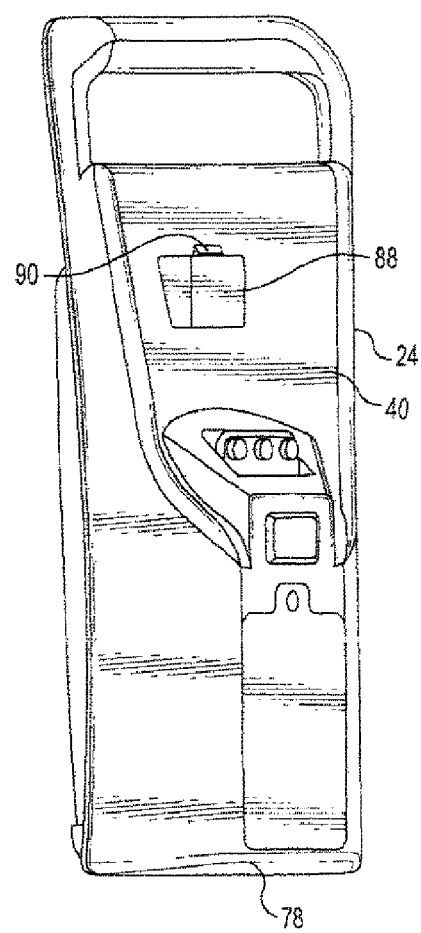
FIG. 7 depicts a rear perspective view of an area light having the alternative locking mechanism.

For instance, and referring to FIGS. 6 and 7, a structure protruding 88 from the rear surface 40 of the area light 24 can include a retractable snap 90 for engaging an indentation 92 of the docking bay 34. The indentation 92 being complementary to the protruding structure 88 and having an edge 94 for engagement by the snap 90. In addition, the docking bay 24 can include a lip extending 96 along a lower peripheral edge 98 so as to prevent a bottom portion 78 of the area light 24 from moving outwardly away from the docking station 22 unless the area light 24 is lifted upward and out over the lip 96.

Referring again to FIG. 2, in an embodiment, each docking bay 34 is a space extending inwardly into the neck 32 and surrounded by a pair of vertical walls 86. An opposite side of each wall 86 of a docking bay 34 serves as the wall 86 for an adjacent docking bay 34. The electrical connection port 36 protrudes outwardly from the neck 32 into each docking bay 34.

In accordance with an embodiment, actuating the docking station power switch 28 causes power to be provided from the docking station power source to each of the area lights 24 docked at the docking station 22. For example, in the embodiment shown, if all four area lights 24 are docked in the docking station 22, the docking station power source causes each area light's light sources 56 to emit light when the docking station power switch 28 is actuated. If one of the area lights 24 is not docked in the clocking station 22, then actuating the docking station power switch 28 causes only the three area lights 24 docked at the docking station 22 to illuminate.

In addition, in an embodiment, each of the area lights 24 can be separately and selectively illuminated. For example, in an embodiment, an area light 24 can be automatically illuminated, by the area lights' own power source, upon removal from the docking station 22. The replacement of the area light 24 on the docking station 22 will return control of the illumination of the area light 24 to the docking station 22.

Alternatively, where the area lights 24 include a power switch 68, the illumination of the area light 24 can be controlled by actuating the area light power switch 68 located on each area lights 24 when they are removed from the docking station 22. Specifically, actuating the area light power switch 68 causes a power source of the area light 24 to provide power to the light source 56. In this manner, an area light 24 can be removed from the docking station 22 and placed in a suitable area, or carried for use as a handheld portable light source.

As a more specific example, while camping, the lantern 20 can be used to illuminate an eating area. One of the area lights 24 can be removed from the docking station 22 to illuminate a different area, such as a cooking area while the remaining area lights 24 docked in the docking station 22 continue to illuminate the eating area. An additional area light 24 can be removed from the clocking station 22 to be used in yet another area, such as a tent, so that the lantern 20 continues to illuminate the eating area. Yet another area light 24 can be removed from the docking station 22 and used to illuminate yet another area. Indeed, as each area light 24 has its own power source, all of the area lights 24 of the lantern 20 can be removed from the docking station 22 and each area light 24 can be used to illuminate a separate area. Therefore, one lantern 20 can be used to illuminate several areas, each area not necessarily in the same general vicinity, simultaneously.

If an area light 24 is no longer needed in a particular area, it can be returned to the docking station 22 where it can be powered by the docking station power source and/or the power source of the docking station can. recharge the power source of the area light 24. In an embodiment, when an area light 24 is returned to the docking station 22, docking station contacts 42, 44, 46 are electrically connected to corresponding area light contacts 60, 64, 66 and the power source of the docking station 22 charges the power source of the area light 24. In this manner, the power source of the area light 24 is generally maintained in a charged state so that it is able to power the light sources when the area light 24 is needed somewhere away from the docking station 22.

Figure 8:
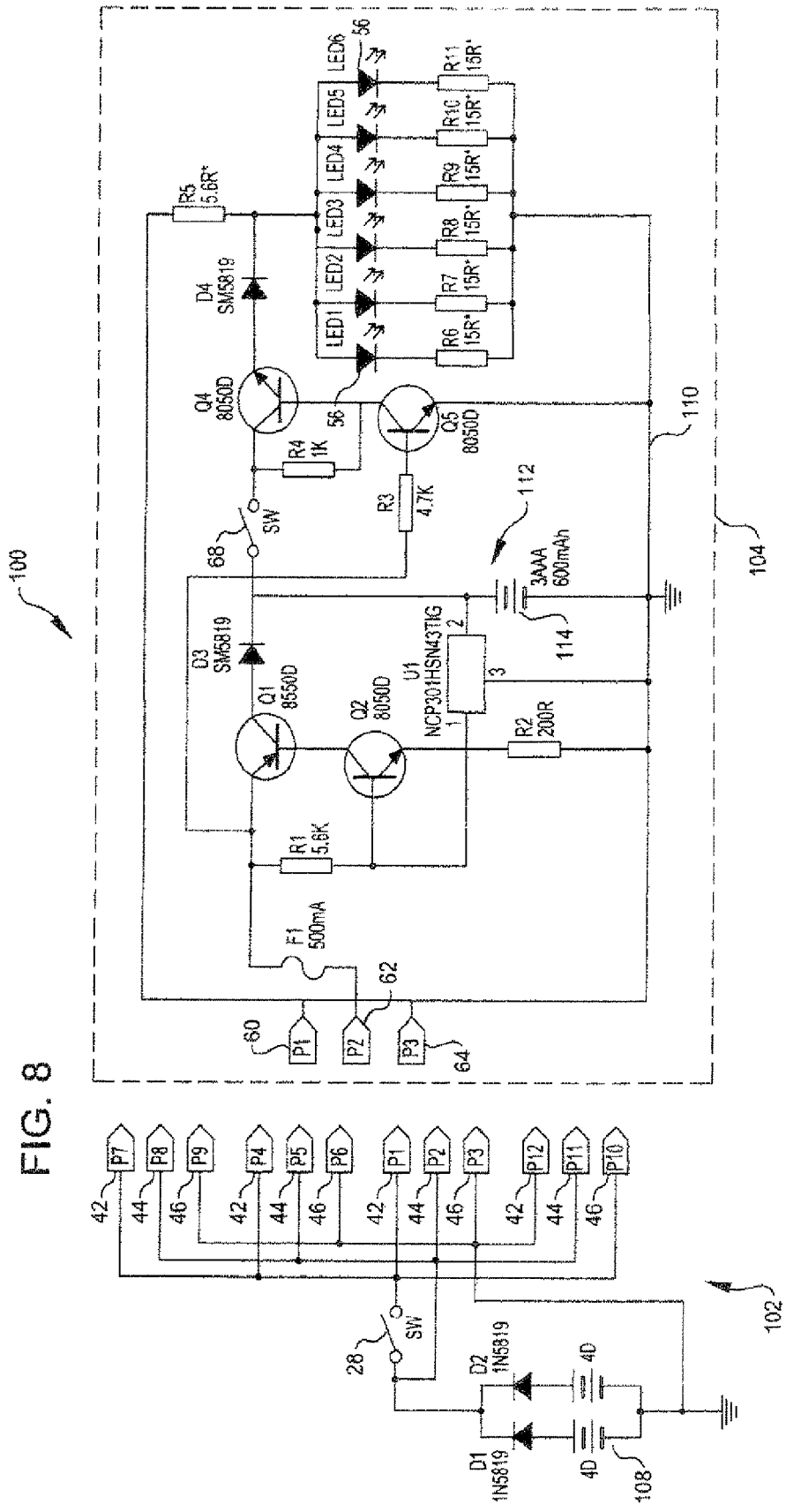
FIG. 8 is a diagram of a circuit which may be incorporated into the lantern of FIG. 1.

Various types of circuits can be incorporated in the lantern 20 in order to provide the above-described functionality. For example, FIG. 8 shows a circuit 100 suitable for use with the lantern 20. The circuit 100 includes a lantern sub-circuit 102 and an area light sub-circuit 104 for each area light 24. When an area light 24 is docked in the docking station 22, in an embodiment, the lantern sub-circuit 102 and the area light sub-circuit 104 are removably and electrically connected with the first docking station contact 42 touching the first area light contact 60, the second docking station contact 44 touching the second area light contact 62, and the third docking station contact 46 touching the third area light contact 64.

The lantern sub-circuit 102, in an embodiment includes a power source 108 which, in an embodiment, is two sets of four 1.5-volt D batteries wired in series with the two sets wired in parallel, although one or more rechargeable 6-volt batteries or other suitable power source can be used. The docking station power switch 28 and the second docking station contact 44 of each docking bay 34 are connected to the positive terminal of the power source 108. The docking station power switch 28 is located between the first docking station contact 42 of each docking bay 34 and the positive terminal of the power source 108. The third docking station contact 46 of each docking bay connects to the negative terminal of the power supply 108.

The area light sub-circuit 104, in an embodiment, is incorporated into each area light 24. The area light sub-circuit 104 includes an outer sub-circuit 110 and an inner sub-circuit 112. The outer sub-circuit 110 includes the light sources 56, wired in parallel, between the first area light contact 60 and third area light contact 64. Therefore, when the area light 24 is docked in the docking station 22, the docking station power switch 28 controls the flow of current from the power supply 108 and the light sources 56 by interrupting or completing the simple circuit comprising the light sources 56 and the power supply 108.

The inner sub-circuit 112 is configured such that, when the area light 24 is docked in the docking station 22, the inner sub-circuit 112 draws power from the power supply 108 in order to charge an area light power supply 114 which, in an embodiment, is three 1.2-volt rechargeable AAA batteries wired in series, although other suitable power supplies can be used. In general, any sub-circuit suitable for charging the area light power supply 114 can be incorporated into the circuit 102.

When the area fight 24 is docked in the docking station 22 and the docking station contacts 42, 44, 46 are electrically connected to the respective area light contacts 60, 62, 64, the second area light contact 62 is connected in a circuit to the positive terminal of the docking station power supply 108 and the third area light contact 64 is connected in a circuit to the negative terminal of the docking station power supply 108. In this manner, when the area light 24 is docked in the docking station 22, the docking station power supply 108 powers the inner sub-circuit 112 to charge the area light power supply 114, regardless of whether the docking station power switch 28 is open or closed.

In an embodiment, the inner sub-circuit 112 is additionally configured such that, when the area light 24 is not docked in the docking station 22, the emission of light from the light source 56 is controlled by the area light power switch 68. Specifically, closing the area light power switch 68 completes a circuit whereby the area light power supply provides power to the light sources 56.

Other circuits can also be used to allow the area lights 24 to be controlled by an area light power switch 68 or a docking station power switch 28 on the docking station 22. For instance, in an alternate embodiment, each area light 24 includes a circuit that closes and provides power to the light sources 56 when the area light power switch 68 is closed. The docking station 22 can include a circuit comprising a docking station power supply 108 and a docking station power switch 28 which is in parallel with the area light power switch 68 when the area light 24 is docked in the docking station 22 so that closing the docking station power switch 28 causes the docking station power supply 108 to provide power to the light sources 56 for their particular area light 24. In general, any suitable circuit or combination of circuits can be used.

Other features can also be included in any circuitry included in the lantern 20. For instance, the docking station, in an embodiment, includes a power input (not shown) so that any area lights 24 connected to the docking station 22 can be alternatively powered by an external AC or DC power source connected to the power input. The power input can additionally or alternatively serve to provide power from an external AC or DC power source for charging the docking station power supply.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A portable lantern comprising:
   a docking station including a self-contained first power supply; and
   a plurality of area lights, each of the plurality of area lights individually removably connectable to the docking station, and each of the plurality of area lights having a second power supply.

2. A portable lantern as set forth in claim 1, further comprising a first power switch positioned on the docking station and electrically connected to the first power supply and each of the plurality of area lights removably connected to the docking station, wherein an actuation of the first power switch provides electrical power from the first power supply to illuminate each of the plurality of area lights removably connected to the docking station.

3. A portable lantern as set forth in claim 2, wherein each of the plurality of area lights includes a second power switch electrically connected to the second power supply, wherein when one of the plurality of area lights removably connected to the docking station is disconnected from the docking station, an actuation of the second power switch provides electrical power from the second power supply to illuminate the disconnected area light.

4. A portable lantern as set forth in claim 3, wherein the first power supply recharges the second power supply of each of the plurality of area lights removably connected to the docking station.

5. A portable lantern as set forth in claim 2, wherein when one of the plurality of area lights removably connected to the docking station is disconnected from the docking station, the second power supply automatically provides power to illuminate the disconnected area light.

6. A portable lantern as set forth in claim 1, wherein each of the plurality of area lights includes a latching mechanism for removable connection to the docking station.

7. A portable lantern as set forth in claim 1, wherein the first and second power supplies are batteries.

8. A portable lantern as set forth in claim 1, wherein the self-contained first power supply comprises one or more batteries.

9. A portable lantern as set forth in claim 1, wherein the self-contained first power supply comprises one or more rechargeable batteries.

10. A portable lantern comprising:
    a docking station comprising a self-contained first power supply, a base, and a neck portion extending from the base, the neck portion including a plurality of docking bays; and
    a plurality of area lights, each of the plurality of area lights individually removably connectable to the docking station, and each of the plurality of area lights having a second power supply, wherein each of the plurality of docking bays is configured to receive one of the plurality of area lights.

11. A portable lantern as set forth in claim 10, wherein each of the plurality of docking bays includes a first electrical connection point.

12. A portable lantern as set forth in claim 11, wherein each of the plurality of area lights includes a light source and a second electrical connection port.

13. A portable lantern as set forth in claim 12, wherein the second electrical connection port of at least one of the plurality of area lights engages the first electrical connection port of at least one of the plurality of docking bays when said area light is positioned within said docking bay.

14. A portable lantern as set forth in claim 13, wherein each of the plurality of area lights comprises a main body including a front surface having the light source, a back surface having the second electrical connection port, and a handle extending from the main body.

15. A portable lantern as set forth in claim 14, wherein a lens covers the light source on the front surface of the main body.

16. A portable lantern as set forth in claim 12, wherein the light source is a LED light source.

17. A portable lantern as set forth in claim 12, wherein each of the plurality of area lights includes a plurality of light sources.

18. A portable lantern as set forth in claim 17, wherein at least one of the light sources is a LED light source.

19. A portable lantern comprising:
    a docking station including a base and a neck portion, the neck portion having a plurality of docking bays;
    a self-contained first power supply positioned within the docking station; and
    a plurality of area lights, each of the plurality of area lights including a light source and a second power supply,
    each of the plurality of area lights being removably connectable to the docking station within one of the plurality of docking bays,
    wherein the first power supply can selectively power each of the light sources of the plurality of area lights connected to the docking station, and
    wherein each of the plurality of area lights is configured so that the second power supply can selectively power the light source when the area light is disconnected from the docking bay.

20. A portable lantern as set forth in claim 19, wherein the self-contained first power supply comprises one or more batteries.

21. A portable lantern as set forth in claim 19, wherein the self-contained first power supply comprises one or more rechargeable batteries.

* * * * *